United States Patent
Oh et al.

(10) Patent No.: US 7,844,034 B1
(45) Date of Patent: Nov. 30, 2010

(54) METHOD AND SYSTEM FOR BRIDGING THIRD PARTIES INTO CALLS

(75) Inventors: Dae-Sik Oh, Overland Park, KS (US); Thomas M. Steele, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1220 days.

(21) Appl. No.: 11/175,916

(22) Filed: Jul. 6, 2005

(51) Int. Cl.
*H04M 11/04* (2006.01)

(52) U.S. Cl. .............. 379/45; 379/202.01; 379/201.01; 379/201.02; 370/261; 709/204; 709/227

(58) Field of Classification Search ............... 379/45, 379/202.01, 201.01, 201.02; 370/261; 709/204, 709/227
See application file for complete search history.

(56) References Cited

U.S. PATENT DOCUMENTS

| | | | |
|---|---|---|---|
| 5,802,160 A * | 9/1998 | Kugell et al. ........... 379/211.04 |
| 6,389,113 B1 * | 5/2002 | Silverman ................. 379/35 |
| 6,718,178 B1 | 4/2004 | Sladek et al. |
| 6,771,742 B2 * | 8/2004 | McCalmont et al. .......... 379/45 |
| 7,046,140 B2 * | 5/2006 | Adamczyk et al. ...... 340/539.18 |
| 7,242,754 B2 | 7/2007 | Adams et al. |
| 7,266,190 B1 | 9/2007 | Mullis et al. |
| 7,317,714 B2 | 1/2008 | Roberts et al. |
| 2003/0035381 A1 * | 2/2003 | Chen et al. .................. 370/261 |
| 2004/0037402 A1 | 2/2004 | Adamczyk et al. |
| 2005/0123105 A9 | 6/2005 | Holt et al. |
| 2006/0245570 A1 * | 11/2006 | Pfleging et al. ........ 379/211.02 |
| 2007/0121799 A1 * | 5/2007 | Binning ....................... 379/37 |

OTHER PUBLICATIONS

U.S. Appl. No. 11/417,861, filed May 3, 2006.
Office Action from U.S. Appl. No. 11/417,861, dated Nov. 25, 2009.

* cited by examiner

*Primary Examiner*—Quynh H Nguyen

(57) ABSTRACT

A method and system for bridging third parties into calls. When a subscriber places a call to a designated number, such as 9-1-1 for instance, the network will automatically connect the call to a conference bridge and to the called party. Further, the network will automatically generate and send to a designated third party contact person an alert message that will invite the contact person to call into the conference bridge, so that the contact person can listen to the call. Advantageously, the invention may thus enable a close friend or relative to more quickly learn about an emergency being reported by the subscriber.

16 Claims, 3 Drawing Sheets

METHOD AND SYSTEM FOR BRIDGING THIRD PARTIES INTO CALLS

FIELD OF THE INVENTION

The present invention relates to telecommunications and, more particularly, to bridging of third parties into calls.

BACKGROUND

When a person places an emergency services call, the person is generally connected to a regional public safety answering point (P SAP), where an emergency services operator answers to the call. Upon connection of the call, the caller typically describes the emergency situation, so that the emergency services operator can dispatch suitable emergency responders, such as fire department personnel, police department personnel, and ambulances, to the caller's location.

SUMMARY

The present invention is directed to a method and system for bridging third parties into calls, such as emergency services calls for instance. As presently contemplated, when a person places an emergency services call, a serving telecommunications network will connect the call to a regional PSAP but will also send an alert message to an emergency contact person, directing the contact person to call into a conference bridge in order to at least listen to the emergency services call.

Advantageously, the emergency contact person can be a relative (e.g., spouse, child, or parent) or friend who cares about the well being of the calling party and who would want to know about an emergency situation involving the calling party. With the benefit of the invention, the emergency contact person can quickly learn about the emergency situation and take any desired action in response.

In one respect, an exemplary embodiment of the invention may take the form of a method that involves (a) receiving a request to set up a first call from a calling party to a called destination, (b) responsive to the request (i) setting up the first call to the called destination and to a conference bridge and (ii) sending an alert message to a third party, the alert message identifying the conference bridge, and (c) thereafter receiving into the conference bridge a second call from the third party and bridging the second call with the first call so that the third party can listen to the first call.

In another respect, the exemplary embodiment may take the form of a method that involves (a) receiving a request to set up a first call from a calling party to a called destination, (b) responsive to the request, (i) setting up the first call from the calling party to the called destination via a conference bridge and (ii) sending an alert message to a third party, the alert message identifying the conference bridge, and (c) thereafter receiving into the conference bridge a second call from the third party and bridging the second call with the first call so that the third party can listen to the first call.

The called destination in the exemplary method can be an emergency number, such as 9-1-1 for instance. However, it can be alternatively be another designated number.

Further, the method may include determining a third party destination, such as a telephone number, e-mail address, instant messaging address, or the like, by referring to a profile record stored for the calling party. The function of sending the alert message to the third party can then involve sending the alert message to the determined third party destination, such as sending the alert message as a short message service (SMS) message, an e-mail message, an instant message, or the like.

In the exemplary embodiment, the stored profile record, and particularly the third party destination, can be provisioned by a user through a Web interface or through any other type of provisioning system.

In an exemplary system, the function of receiving the call request can involve receiving the call request into a switch, such as a mobile switching center or service switching point for instance. Applying advanced intelligent network principles and/or emergency call setup procedures, the switch may then pause call processing and signal to a call controller such as a service control point or mobile positioning center.

The call controller may then determine a third party destination by referring to a stored profile record for the calling party and may itself send the alert message to the third party destination. Alternatively, the call controller can direct some other entity to send the alert message to the third party destination. Further, the call controller may direct the switch to set up the call to the conference bridge and to the called destination. In response, the switch may set up the call to the conference bridge, and the conference bridge may then proxy the call to the called destination. Alternatively, the switch may set up one leg of the call to the conference bridge and another leg of the call to the called destination and may bridge the two legs together.

In the exemplary embodiment, the conference bridge will restrict the third party to a listen-only mode with respect to the call. Thus, the third party will be able to hear at least some portion of the call, but the conference bridge will preferably not inject into the call any speech or other media from the third party. Alternatively, the conference bridge can connect the third party to the call in a more full manner, such as allowing the third party to both listen and talk in the call.

In yet another respect, the exemplary embodiment may take the form of a system that includes a switch, a call controller, and a conference bridge. The switch would be arranged to serve a plurality of subscribers. The call controller would be communicatively linked with the switch and would be arranged to provide the switch with call processing guidance. Further, the call controller would include or have access to a profile store that stores for each of a plurality of telephone subscribers a respective emergency contact destination. The conference bridge would be arranged to receive calls from multiple parties and to bridge the calls together.

In operation, when the switch receives an emergency call from a given subscriber, the switch would signal to the call controller, and the call controller would (i) direct the switch to set up the emergency call to the conference bridge and to a public safety answering point, (ii) determine from the profile store the emergency contact for the given subscriber, and (iii) send an alert message to the emergency contact, directing the emergency contact to call into the conference bridge. That way, when the emergency contact calls into the conference bridge, the conference bridge can bridge the emergency contact into the emergency call, so that the emergency contact can listen to the emergency call.

These and other aspects, advantages, and alternatives will become apparent to those of ordinary skill in the art by reading the following detailed description with reference where appropriate to the accompanying drawings.

DETAILED DESCRIPTION

Figure 1:
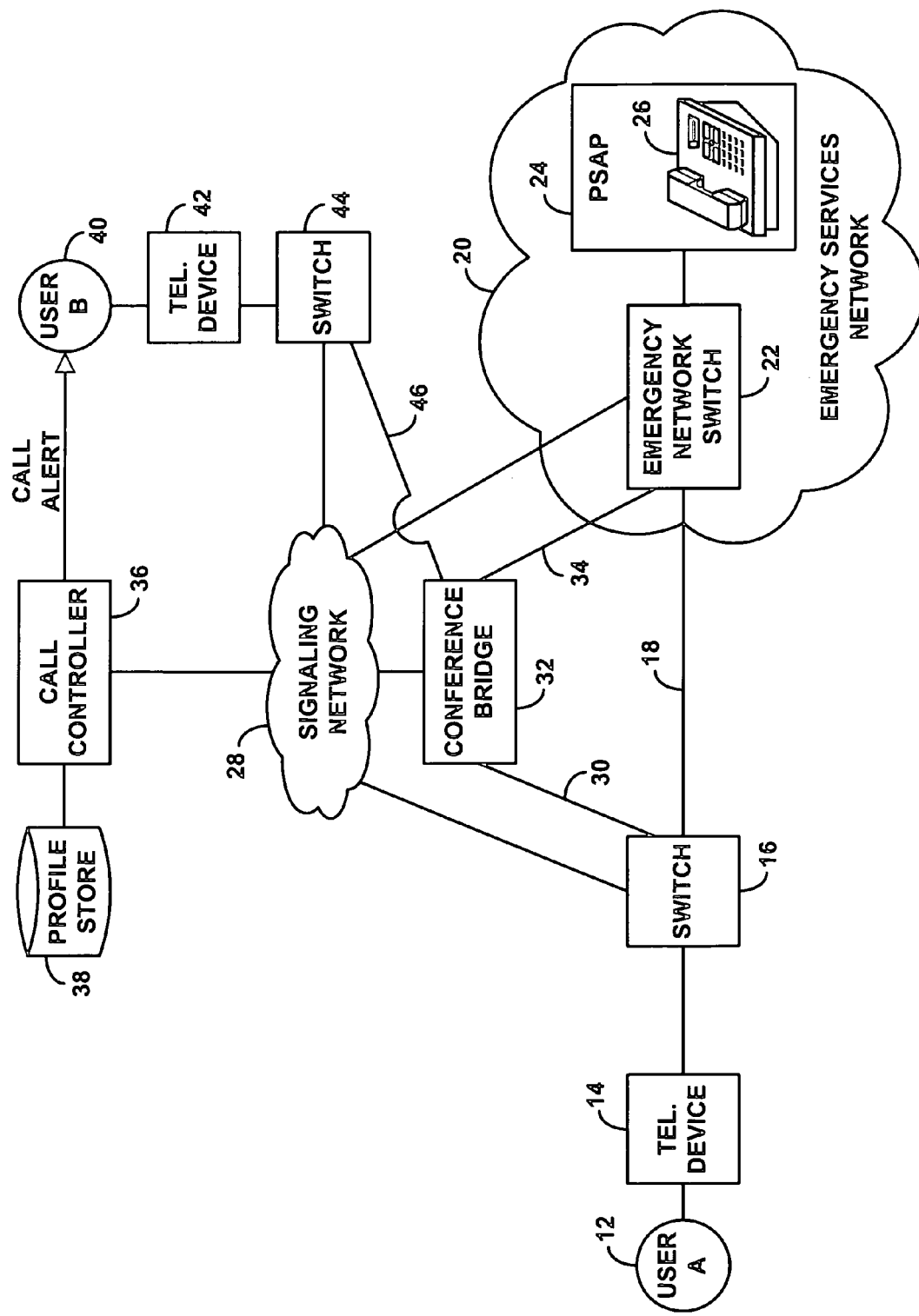
FIG. 1 is a simplified block diagram of a communication system in which an exemplary embodiment of the invention can be implemented

Referring to the drawings, FIG. 1 is a simplified block diagram of a communication system in which the exemplary embodiment can be implemented. It should be understood, of course, that this and other arrangements and functions described herein are intended to be examples only and, thus, that numerous variations may be possible. For instance, elements can be added, omitted, combined, distributed, reordered, repositioned, or otherwise changed while remaining within the scope of the invention as defined by the claims. Further, it should be understood that various functions described herein can be carried out by hardware, firmware, and/or software (e.g., one or more processors programmed with machine language instructions to carry out the functions).

As shown in FIG. 1, the exemplary communication system includes a first user ("User A") 12 who operates a first telephone device 14 served by a first switch 16. Switch 16 is connected by a voice trunk 18 or other link with an emergency services network 20 and, particularly, with an emergency network switch 22 that provides connectivity with a PSAP 24. PSAP 24 then includes an emergency services operator terminal 26, at which an operator may work to respond to emergency services calls. Further, switch 16 is connected with a signaling network 28, such as a Signaling System #7 (SS7) network, for instance, through which switch 16 can engage in signaling with other network entities in order to set up calls for devices such as device 14.

With this basic arrangement, when User A places an emergency services call (e.g., 9-1-1 call) at device 14, switch 16 will receive the dialed digits from device 14. In response, switch 16 may then engage in standard call setup signaling (e.g., ISUP signaling) with emergency network switch 22 via signaling network 28, in order to set up the call over voice trunk 18 to emergency network switch 22, and emergency network switch 22 may responsively set up the call to PSAP 24. Upon connection of the call, User A can then confer with the emergency services operator at terminal 26, to report an emergency situation.

As further shown, switch 16 is connected by a voice trunk 30 or other link with a conference bridge 32, and the conference bridge 32 is connected by a voice trunk 34 or other link with emergency network switch 22. Conference bridge 32 generally functions to bridge together calls with multiple parties, so as to allow the parties to communicate with each other. To facilitate setting up calls with the conference bridge 32, the conference bridge 32 may include signaling logic and signaling ports that allow it to engage in call setup signaling (e.g., ISUP signaling) with other network entities, such as with switch 16 and emergency network switch 22 for instance. Alternatively, the conference bridge 32 may itself be served by a separate switch (e.g., switch 16 or emergency network switch 22), in which case its serving switch can work to set up any calls to and from the conference bridge 32, and such calls would be routed to and from the conference bridge 32 through the serving switch. Conference bridge 32 can also be located elsewhere, such as within the emergency services network 20 for instance.

FIG. 1 further depicts a call controller 36 coupled with signaling network 28. In the exemplary embodiment, call controller 36 can be an advanced intelligent network (AIN) policy decision point (PDP) such as a service control point (SCP) for instance, and it preferably includes or has access to a profile store 38 that contains service profile information for subscribers, such as device 14 and/or User A for instance. In another embodiment, the call controller 36 can be a mobile positioning center (MPC) of the type that is commonly used to determine and report the location of a mobile wireless device placing a 9-1-1 call, for use by a PSAP that receives the call.

Applying general AIN principles, when User A places a call to a particular telephone number, switch 16 may encounter an AIN trigger point (such as an all-digits trigger, or a trigger keyed to the calling or called number) in its call processing logic and may responsively signal to the call controller 36. For example, switch 16 may send to call controller 36, via signaling network 28, an industry standard IS-771 or IS-41 Origination Request (ORREQ) message that provides the call controller with information about the call, such as the calling and called numbers for instance. Call controller 36 may then look up the service profile of User A (or device 14) in profile store 38 and may execute applicable service logic to determine that the call should be allowed, blocked, redirected to a particular number, or handled in some other manner. Call controller 36 may then send an Origination Request return result (orreq_rr) message via signaling network 28 to switch 16, providing switch 16 with a predefined code directing switch 16 to carry out the determined function. For instance, to cause switch 16 to redirect a call to a particular number, call controller 36 may include in its orreq_rr message to switch 16 (i) the redirect number and (ii) a redirect command code. Switch 16 may then carry out the service directive.

(Note that in an alternative embodiment, switch 16 may itself maintain service logic and service profile information for various subscribers, such as User A and/or device 14 for instance, and switch 16 may then carry out the functions described herein as being carried out by the call controller. Such an arrangement is generally less desirable, since it decentralizes call processing logic. However it is possible.)

FIG. 1 additionally depicts a second user ("User B") 40, who operates a second telephone device 42 that is served by a second switch 44. Note that Users A and B can be served by a common switch, in which case switch 44 would be switch 16. Switch 44 is shown coupled by a voice trunk 46 or other link with conference bridge 32. Further, switch 44 is shown coupled with signaling network 28, so that switch 44 can engage in signaling (e.g., ISUP signaling) to set up calls with other network entities, such as conference bridge 32 for instance.

Note that the telephone connections shown between device 14 and switch 16, and between device 42 and switch 44, can take various forms and can be the same as or different than each other. For example, either or each connection can be a landline telephone connection, in which the device is coupled by a wired subscriber line with a central office switch. As another example, either or each connection can be a cellular wireless connection, in which the device communicates over an air interface with a base transceiver station (BTS), the BTS is coupled with a base station controller (BSC), and the BSC is then coupled with the switch. Further, suitable telephone connections can take still other forms, including landline and/or wireless components, and circuit-switched and/or packet-switched components.

Figure 2:
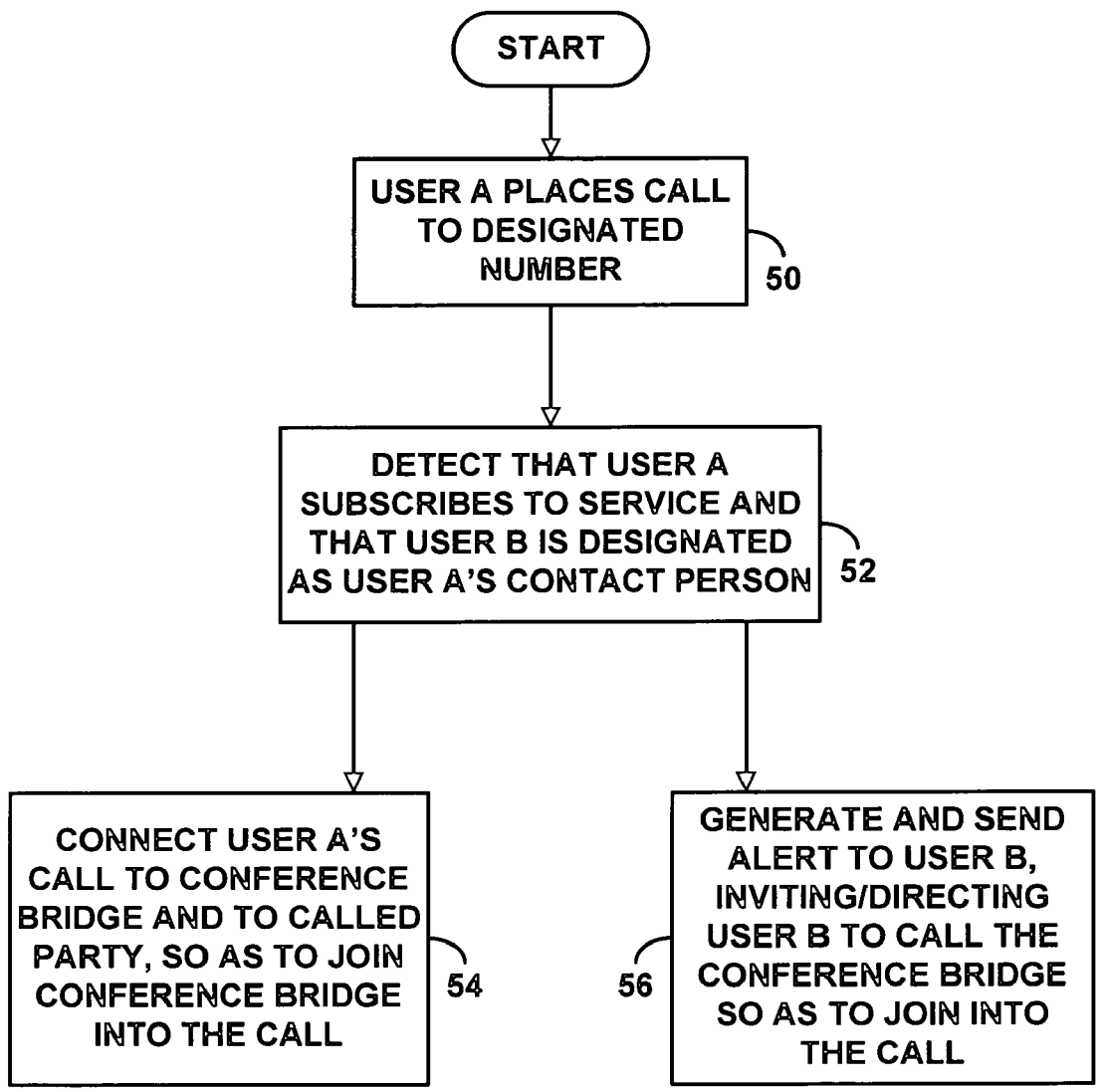
FIG. 2 is a flow chart depicting functions that can be carried out in accordance with the exemplary embodiment.

FIG. 2 is a flow chart generally depicting a set of functions carried out in accordance with the exemplary embodiment. As shown in FIG. 2, at step 50, User A places a call to a particular number, such as an emergency services call to 9-1-1 for instance. At step 52, the network will then automatically detect that User A (or device 14) subscribes to a call alert/bridging service and that User B (or device 42) is designated as a third party contact person for User A. In response, the network will then preferably take at least two actions. First, at step 54, the network will connect User A's call to both conference bridge 32 and the called party, so that the conference bridge 32 will be effectively or actually joined into the call. Second, at step 56, the network will generate and send an alert message to User B, informing User B about the call and directing or inviting User B to call the conference bridge 32 so that User B can be effectively or actually joined into the call as well.

These exemplary functions can be carried out by various entities in the arrangement shown in FIG. 1. In a preferred embodiment, for example, when User A places a 9-1-1 call and switch 16 signals up to call controller 36, call controller 36 will perform the functions of (i) detecting that User A (or device 14) subscribes to the service and that User B is designated as User A's contact person and (ii) sending the call alert to User B. Further, call controller 36 will instruct switch 16 to set up the call to the conference bridge 32 and to the called party, and switch 16 will carry out that directive.

In an alternative embodiment, however, switch 16 can itself perform the functions of detecting that User A subscribes to the service and/or sending the alert to User B, in addition to the function of setting up the call to the conference bridge and to the called party. Still alternatively, these or other functions can be carried out by an entity emergency services network 20, such as network switch 22 for instance, or by some other entity whether or not shown in FIG. 1.

In the preferred embodiment, profile store 38 includes a service profile record for each subscriber, which the subscriber can provision through an online (e.g., web-based) provisioning interface or in some other manner. Each service profile record preferably indicates whether the subscriber subscribes to the present alert/bridging service and, if so, who should be alerted and invited to call into the conference bridge for the call. For example, the profile store 38 may include records as shown in the Table 1:

TABLE 1

| Subscriber ID | Alert/ Bridging Service | Called Destination | Third Party Dest. Type | Third Party Destination |
|---|---|---|---|---|
| 847-555-1234 | Yes | 911 | SMS | 847-444-9876 |
| 847-555-7878 | No | — | — | — |
| 847-555-2345 | Yes | 911 | SMS | 847-333-6789 |
| 847-555-0987 | Yes | 913-555-4545 | E-mail | UserB@realm.com |

In this example table, the "subscriber ID" field contains a subscriber identifier, such as an assigned telephone number or other identifier, associated with a subscriber. Call controller 36 can use this field to look up the record for the subscriber at issue, based on the calling number indicated in signaling from switch 16 for instance.

The "alert/bridging service" field next contains a Boolean flag that indicates whether the subscriber subscribes to the present alert/bridging service. In turn, if the subscriber subscribes to the service, the "called destination" field will contain the telephone number which, when called by the subscriber, should trigger the inventive service, and the "third party destination type" and "third party destination" fields will provide information defining which third party contact person to alert and how to alert the contact person.

As shown in Table 1, the called destination for each subscriber could be an emergency number such as 9-1-1, or it could be some other designated number. Alternatively, the called destination could be something other than a number, such as a Session Initiation Protocol (SIP) address or IP address for instance (which would be useful for extending the invention to voice-over-IP calling). Also alternatively, although Table 1 lists only one called destination per subscriber, profile store 38 could just as well list more than one called destination per subscriber, possibly with distinct third party contact information per called destination.

The third party destination for each subscriber is preferably a contact address to which the call controller 36 should send an alert message when the subscriber attempts to call the designated called destination. The third party destination can take various forms, examples of which include a short-messaging-service (SMS) address, an e-mail address, an instant messing address, or simply a telephone number. The third party destination type field specifies the type of third party destination and thus indicates how call controller 36, or the network generally, should send the alert message to the third party contact person.

In operation, when call controller 36 receives a signaling message from switch 16 indicating that User A (or device 14) is calling a designated number, call controller 36 may consult profile store 38 and thereby determine that User A (or device 14) subscribes to the present service. Call controller 36 may then send a response message to switch 16, directing switch 16 to set up the call to both conference bridge 32 and the called party. More particularly, in its response message to switch 16, call controller 36 may include a predefined code that switch 16 is programmed to interpret as the directive.

The act of setting up the call to both the conference bridge 32 and the called party can occur in various ways. In one embodiment, for instance, switch 16 may set up the call to the conference bridge 32, and conference bridge 32 may then proxy the call to the called party, so that the call between User A and the called party will flow through the conference bridge. In this embodiment, switch 16 can engage in ISUP signaling to set up a first leg of the call to the conference bridge 32 and to provide the conference bridge with the called party number. Provided with the called party number, conference bridge 32 can then engage in ISUP signaling to set up a second leg of the call to the called party. Conference bridge 32 may then bridge those call legs together. In another embodiment, switch 16 may itself set up two legs of the call, one to the conference bridge 32 and another to the called party, and switch 16 may bridge those two legs together.

Call controller 36 may direct switch 16 to set up the call to a particular port or bridge number at conference bridge 32, such as one that call controller has selected from a pool (or has determined through real-time signaling with conference bridge for instance). Each port or bridge number at conference bridge 32 may have a respective routing number or a respective conference PIN (personal identification number). Call controller may specify the port or bridge number in its signaling to switch 16, so that switch 16 will set up the call to the designated port or number at conference bridge 32.

In addition to directing switch 16 to set up the call to conference bridge 32, call controller 36 will generate and send an alert message to User B, the third party destination specified by the profile record for User A (or device 14). In the preferred embodiment, the alert message be structured to inform User B about User A's call and to invite or direct User B to call into the conference bridge in order to join the call. By way of example, the alert message may first state to User B that User A has called the designated number, and the alert message may then provide User B with conference bridge information that User B can use to call into the bridge in order to join the call. The conference bridge information may include a telephone number of conference bridge 32, possibly together with a PIN or other bridge identifying data.

Figure 3:
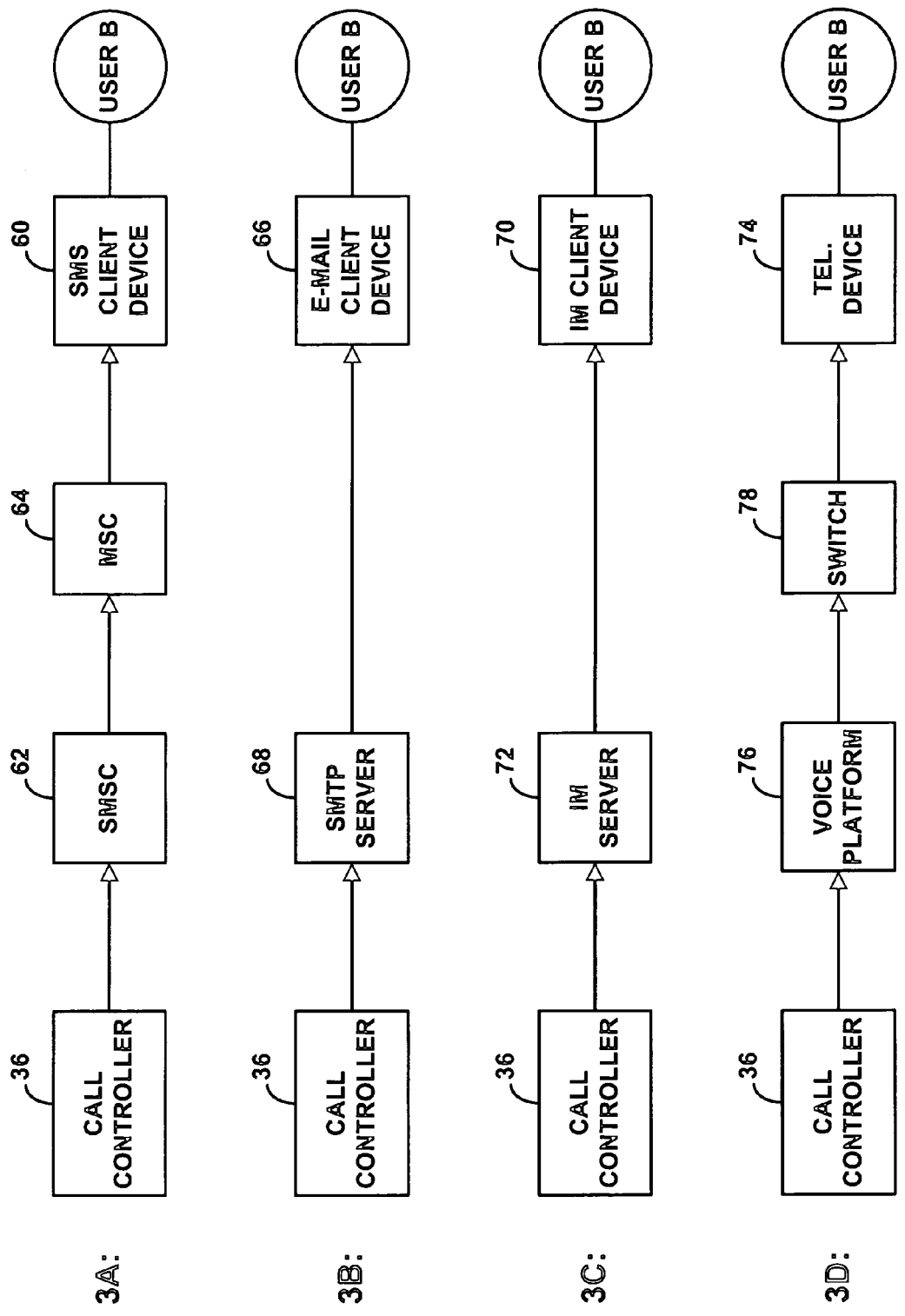
FIG. 3 depicts example alert message paths that can be used in accordance with the exemplary embodiment.

Call controller 36 may send the alert message to User B in various ways, examples of which are illustrated by FIG. 3.

As shown in FIG. 3A, for instance, call controller 36 may send the alert message via SMS to a mobile phone or other SMS client device 60 operated by User B. In that case, call controller 36 may use industry standard SMS signaling to send the alert message via signaling network 28 to an SMS Controller (SMSC) 62, designating the SMS address of device 60. The SMSC 62 may then send the message to a mobile switching center (MSC) 64 that serves the destination device 60, and the MSC 64 may deliver the message over an air interface to the device 60. Device 60 may then present the message to User B on a display screen, and User B may read the message.

Alternatively, as shown in FIG. 3B, call controller 36 may send the alert message as an e-mail message to a computer or other e-mail client device 66 operated by User B. In that case, call controller 36 may use standard SMTP signaling to send the alert message over an IP network (not shown) to an SMTP server 68. And the SMTP server 68 may deliver the message as an e-mail message to device 66. Device 66 may then present the message to User B on a display screen, and User B may read the message.

Still alternatively, as shown in FIG. 3C, call controller 36 may send the alert message as an instant message to a computer or other instant messaging (IM) client device 70 operated by User B. In that case, call controller 36 may use instant messaging signaling (such as SIP signaling, for instance) to deliver the alert message over an IP network (not shown) to an IM server 72. And IM server 72 may deliver the message as an instant message to device 70. Device 70 may then present the message to User B on a display screen, and User B may read the message.

Yet alternatively, as shown in FIG. 3D, call controller 36 may send the alert message as a voice call to a telephone device 74 operated by User B. In that case, call controller 36 may invoke a voice-services platform (such as an interactive voice response unit, for instance) 76 and direct the platform to place a telephone call to telephone device 74 and to "speak" the alert message to the answering party. More particularly, call controller 36 could provide a directive to platform 76 as a Voice-XML (VXML) document or command for instance. Platform 76 may then call device 74 via a switch 78 and, when User B answers the call, platform 76 may apply a text-to-speech engine to read out the alert message to User B.

Once User B receives the alert message, User B may then call into conference bridge 32 as indicated by the alert message, in order to join into the call. The telephone device 44 that User B uses to call into conference bridge 32 can be the same device on which User B received the alert message from call controller 36, or it can be another device. If it is the same device, the device could include logic to automatically initiate the call to the conference bridge 32 upon receipt of the alert message. Alternatively, given the conference bridge telephone number (and PIN or other information if necessary), User B can manually dial into the bridge.

When User B calls into conference bridge 32 using the information supplied in the alert message by call controller 36, conference bridge 32 will bridge User B into User A's call. In the preferred embodiment, conference bridge 32 will restrict User B to a listen-only mode with respect to the call, such that User B will be able to listen to the call but will not be able to otherwise participate in the call; for instance, conference bridge 32 would not inject speech from User B into the ongoing call. In an alternative embodiment as noted above, however, conference bridge 32 could be arranged to allow User B to participate more fully in User A's call.

With the benefit of the invention as described, the profile record for User A stored in profile store 38 can specify that User A subscribes to the present service for 9-1-1 calls and can designate User B's SMS address as a third party contact person. When User A places a call to 9-1-1, switch 16 would then signal up to call controller 36, providing call controller 36 with the calling and called numbers. After referring to profile store 38, call controller 36 would then send a response message to switch 16, directing switch 16 to set up the call to conference bridge 32 and to PSAP 24, and switch 16 would do so. Further, call controller 36 would generate and send an alert message to User B's SMS address, inviting or directing User B to call into the conference bridge to listen to the call. User B may then call into the bridge and listen to the call, thereby learning about the emergency being reported by User A.

An exemplary embodiment of the present invention has been described above. Those skilled in the art will understand, however, that changes and modifications may be made to this embodiment without departing from the true scope and spirit of the present invention, which is defined by the claims.

What is claimed is:

1. A method comprising:
   receiving a request to set up a first call from a calling party to a called destination, the request specifying the called destination;
   responsive to the request (i) accessing a profile associated with the calling party, the profile including a plurality of different called destinations and correlation data setting forth an associated third party destination respectively for each of the plurality of called destinations specified in the profile, (ii) using the correlation data stored in the profile to determine a third party destination based on the calling party and the called destination specified in the request, (iii) setting up the first call to the called destination and to a conference bridge, and (iv) sending an alert message to the determined third party destination, the alert message identifying the conference bridge; and
   thereafter receiving into the conference bridge a second call from a third party and bridging the second call with the first call so that the third party can listen to the first call.

2. A method comprising:
   receiving a request to set up a first call from a calling party to a called destination, the request specifying the called destination;
   responsive to the request, (i) accessing a profile associated with the calling party, the profile including a plurality of different called destinations and correlation data setting forth an associated third party destination respectively for each of the plurality of called destinations specified in the profile, (ii) using the correlation data stored in the profile to determine a third party destination based on the calling party and the called destination specified in the request, (iii) setting up the first call from the calling party to the called destination via a conference bridge and (iv) sending an alert message to the determined third party destination, the alert message identifying the conference bridge; and
   thereafter receiving into the conference bridge a second call from a third party and bridging the second call with the first call so that the third party can listen to the first call.

3. The method of claim 2, wherein the specified called destination is an emergency number.

4. The method of claim 3, wherein the emergency number is 9-1-1.

5. The method of claim 2, further comprising receiving a user directive to provision the profile record with the third party destination.

6. The method of claim 2, wherein the alert message comprises a message type selected from the group consisting of a short message service (SMS) message, an e-mail message, an instant message, and a voice message.

7. The method of claim 2, wherein receiving the request comprises receiving the request into a switch, the method further comprising the switch sending a signaling message to a call controller in response to the request, wherein sending the alert message to the determined third party destination comprises the call controller sending the alert message to the determined third party destination.

8. The method of claim 7, wherein the call controller comprises a service control point.

9. The method of claim 7, wherein the first call comprises an emergency call, and wherein the call controller comprises a mobile positioning center that determines and reports a location of the calling party for use by a public safety answering point that receives the first call.

10. The method of claim 7, further comprising the call controller directing the switch to set up the first call to the conference bridge, wherein the conference bridge in turn sets up the first call to the called destination.

11. The method of claim 2, wherein setting up the first call from the calling party to the called destination via the conference bridge comprises:

setting up a first leg of the first call from the calling party to the conference bridge;

setting up a second leg of the first call from the conference bridge to the called destination; and bridging the first leg and second leg together at the conference bridge.

12. The method of claim 2, wherein the alert message provides the third party destination with a conference bridge number, and wherein the second call is placed to the conference bridge number.

13. The method of claim 2, further comprising the conference bridge restricting the third party to a listen-only mode with respect to the first call.

14. A system comprising:

a switch arranged to serve a plurality of subscribers;

a call controller communicatively linked with the switch and arranged to provide the switch with call processing guidance, the call controller including or having access to a profile store that stores a profile for each of a plurality of telephone subscribers, each profile including a plurality of different called destinations and correlation data setting forth an associated third party destination respectively for each of the plurality of called destinations specified in the profile; and a conference bridge arranged to receive calls from multiple parties and to bridge the calls together, wherein when the switch receives an emergency call request from a given subscriber specifying a called destination, the switch signals to the call controller, and the call controller (i) directs the switch to set up the emergency call to the conference bridge and to a public safety answering point by directing the switch to set up the emergency call to the conference bridge, wherein the conference bridge then proxies the emergency call to the public safety answering point, (ii) accesses a profile associated with the calling party from the profile store, (iii) uses the correlation data stored in the profile to determine an emergency contact destination based on the calling party and the called destination specified in the request, and (iv) sends an alert message to the emergency contact destination, directing the emergency contact to call into the conference bridge, whereby when the emergency contact calls into the conference bridge, the conference bridge bridges the emergency contact into the emergency call, so that the emergency contact can listen to the emergency call.

15. The system of claim 14, wherein the conference bridge restricts the emergency contact to a listen-only mode with respect to the emergency call.

16. A system comprising:

a switch arranged to serve a plurality of subscribers;

a call controller communicatively linked with the switch and arranged to provide the switch with call processing guidance, the call controller including or having access to a profile store that stores a profile for each of a plurality of telephone subscribers, each profile including a plurality of different called destinations and correlation data setting forth an associated third party destination respectively for each of the plurality of called destinations specified in the profile; and a conference bridge arranged to receive calls from multiple parties and to bridge the calls together, wherein when the switch receives an emergency call request from a given subscriber specifying a called destination, the switch signals to the call controller, and the call controller (i) accesses a profile associated with the calling party from the profile store, (ii) uses the correlation data stored in the profile to determine an emergency contact destination based on the specified calling party and the destination specified in the request, (iii) directs the switch to set up the emergency call to the conference bridge and to a public safety answering point, and (iv) sends an alert message to the emergency contact destination, directing the emergency contact to call into the conference bridge, whereby when the emergency contact calls into the conference bridge, the conference bridge bridges the emergency contact into the emergency call, so that the emergency contact can listen to the emergency call.

* * * * *